United States Patent Office 3,584,028
Patented June 8, 1971

3,584,028
PREPARATION OF ORGANIC ISOCYANATES
Perry A. Argabright, Vernon J. Sinkey, and Brian L. Phillips, Littleton, Colo., assignors to Marathon Oil Company, Findlay, Ohio
No Drawing. Filed Jan. 25, 1967, Ser. No. 611,589
Int. Cl. C07c 119/04; C07d 55/12
U.S. Cl. 260—453
12 Claims

ABSTRACT OF THE DISCLOSURE

The present invention comprises a process for the manufacture of organic isocyanates comprising reacting organic chlorides with metal cyanates in the conjoint presence of a catalyst selected from the group consisting of alkali metal bromides, alkaline earth metal bromides, alkali metal iodides and alkaline earth metal iodides and an aprotic solvent.

BACKGROUND OF THE INVENTION

The present invention relates to the manufacture of organic isocyanates and, as coproducts, some amount of organic isocyanurates.

The reaction of metal cyanates with organic halides to produce the isocyanurates which are the by-products of the present invention has been taught previously. For example, 38 Bulletin Chem. Soc. Japan, p. 1587 (1965), includes equations showing that isocyanurate is the end product and that any organic isocyanates formed further react to produce additional isocyanurates.

SUMMARY

The present invention embodies the discovery that by the use of the specified halide catalysts i.e. alkali metal bromides, alkali metal iodides, alkaline earth metal bromides, and alkaline earth metal iodides (in order of decreasing preference) organic chlorides which contain a single reactive chlorine (for the purposes of the present invention, chlorines which are located on unsaturated or aromatic carbon atoms are substantially unreactive and are ignored herein) with a metal cyanate to produce valuable organic isocyanates useful as chemical intermediates for the production of insecticides and other compounds and for other purposes.

In general, the processes of the present invention will produce some by-product isocyanurates which are valuable and may be recovered. However, the present invention permits the production of organic isocyanates in yields of 55% or even more, based on the weight of the products produced.

DESCRIPTION OF THE PREFERRED EMBODIMENT

The preferred chloride starting materials for use with the present invention are those compounds which contain only one chlorine which is on an aliphatic carbon atom. Especially preferred are benzylic and allylic chlorides. While not narrowly critical, the carbon atom content of the starting materials will preferably be from 1 to about 20, more preferably from 1 to about 12, and most preferably from 1 to about 7. Among the most preferred starting materials are allyl chloride, benzyl chloride, methyl chloride, and octyl chloride. These compounds may be substituted with various organic groups so long as such groups do not interfere with the reactions of the present invention. Especially preferred starting materials are alkyl chlorides containing from 1 to about 6 carbon atoms.

The metal cyanates for use with the present invention will be soluble, to some extent, in the reaction mixture and most preferably will be alkali metal or alkaline earth metal cyanates, with the former being preferred. Among the most preferred metal cyanates for use with the present invention are sodium cyanate and potassium cyanate. In general, from about 0.5 to about 5, and more preferably from 0.8 to about 1.2 moles of cyanate group, will be present for each mole of active chloride in the organic chloride.

The catalysts of the present invention are alkali metal iodides, alkaline earth metal iodides, and the corresponding bromides. Alkali metal cations are preferred and bromine is the preferred anion. Most preferred for the practice of the present invention are potassium iodide, sodium iodide, potassium bromide, and sodium bromide. The catalyst will preferably be present in the reaction mixture in amounts of from about 0.01 to about 10, and more preferably from 0.5 to about .25 mole of catalyst per mole of active chloride in the organic chloride in the reaction mixture.

By aprotic solvent is meant compositions which are liquid under the conditions of the reaction, which have a high dielectric constant (greater than about 15 at 25 degrees C.), which are dipolar, that is, one part of the molecule has a more positive electrical charge relative to the other parts of the molecule causing the molecule to act as a dipole, are sufficiently inert not to enter into deleterious side reactions to a significant degree under the reaction conditions, and which do not possess hydrogen atoms capable of hydrogen bonding with, or transferring to anions in solution in the reaction mixture. The aprotic solvent can be composed of a mixture of liquids so long as the over-all liquid compositions meet the above criteria. Preferred among the aprotic solvents are N-alkyl pyrrolidones, dialkyl formamides (e.g., N,N-dimethylformamide), N,N - dimethylacetamide, acetonitrile, N-alkyl pyrrolidone, hexaalkylphosphoramide, and tetraalkylurea, especially those in which the alkyl groups are methyl groups. The most preferred solvent for the reaction of the present invention is dimethylformamide. Preferably from about 10 to about 100, and most preferably from about 25 to about 50 moles, of the solvent will be present for each mole of halide starting material.

The reaction of the present invention is preferably conducted at a temperature of from about 25 to about 300 degrees C., and most preferably at from 50 to about 150 degrees C. Pressure is not critical and may be from below one atmosphere to over 10,000 p.s.i.g. In most cases, it will be preferable to conduct the reaction anaerobically on a batch-type basis, although flow systems may be utilized. The most convenient apparatus will, in most cases, be a conventional tight-lid varnish cooker or similar reactor having a reflux condenser, provision for agitation, and the usual controls for temperature and pressure.

Among the products of the present invention are: methyl isocyanate, ethyl isocyanate, hexylisocyanate, dodecyl isocyanate, benzyl isocyanate, allyl isocyanate, and a wide variety of other monoisocyanates in addition to the by-products which are the corresponding substituted isocyanurates, e.g. trimethylisocyanurate, triethylisocyanurate, tridodecylisocyanurate, etc., respectively.

Example I

To a reactor equipped with a means for maintaining a nitrogen atmosphere and a means for agitation, was added 100 ml. of a 0.5 molar solution of benzyl chloride in DMF and 0.594 g. of potassium bromide (0.005 mole). This mixture is heated to 100 degrees C. and 3.90 g. of sodium cyanate (0.06 mole) then added. This mixture is held at 100 degrees C. for 50 minutes with agitation. A portion of the solution is then analyzed by an infrared spectroscopy quantitative method for isocyanate. By this procedure it is determined that a 46.0% yield of isocyanate is obtained.

Example II

In contrast to this result, when the reaction is conducted essentially as described in Example I, but in the absence of the potassium bromide catalyst and for a period of one hour a 10.0% yield of isocyanate is obtained.

Example III

The above procedure is followed essentially as described with the exception that 100 ml. of a 0.5 molar solution of allyl chloride in DMF is employed for the reaction with sodium cyanate in the presence of 0.005 mole of potassium bromide. The temperature employed is 100 degrees C. and the reaction time 50 minutes. A 39.0% yield of allyl isocyanate is obtained.

In contrast to this result, when the reaction is conducted essentially as described, in the absence of a potassium bromide catalyst and for a period of 50 minutes, a 9.0% yield of isocyanate is obtained.

Example IV

The procedure of Example I is followed essentially as described with the exception that 100 ml. of a 0.5 molar solution of N-octyl chloride in DMF is employed for the reaction with sodium cyanate in the presence of 0.005 mole of potassium bromide. The temperature employed is 100 degrees C. and the reaction time 50 minutes. A 6.8% yield of N-octyl isocyanate is obtained.

What is claimed is:

1. A process for the manufacture of alkyl, allyl, and benzyl-mono-isocyanates comprising reacting an organic monochloride containing from 1 to 20 carbon atoms and being selected from the group consisting of alkyl chloride, allyl chloride, and benzyl chloride with an alkali metal cyanate or an alkaline earth metal cyanate in the conjoint presence of a catalyst selected from the group consisting of alkali metal bromides, alkaline earth metal bromides, alkali metal iodides and alkaline earth metal iodides and an aprotic solvent selected from the group consisting of N-methyl pyrrolidones, dimethyl formamides, N,N-dimethylacetamide, acetonitrile, N-methylpyrrolidone hexamethyl-phosphoramide, and tetra-methylurea.

2. The process of claim 1 wherein the said monochloride comprises a major portion of allyl chloride.

3. The process of claim 1 wherein said monochloride is benzyl chloride.

4. The process of claim 1 wherein said monochloride is alkyl chloride containing from 1 to about 6 carbon atoms.

5. The process of claim 1 wherein said monochloride is methyl chloride.

6. The process of claim 1 wherein the aprotic solvent is dimethylformamide.

7. The process of claim 1 wherein the reaction is conducted at a temperature of from 25 to 300° C., and wherein the catalyst is an alkali metal iodide or bromide.

8. The process of claim 7 wherein there are present in the reaction mixture from 10 to about 100 moles of aprotic solvent for each mole of said monochloride starting material.

9. The process of claim 8 wherein there are present in the reaction mixture from 0.01 to about 10 moles of catalyst per mole of said monochloride.

10. The process of claim 9 wherein the cyanate is potassium cyanate or sodium cyanate and wherein the catalyst is selected from the group consisting of potassium iodide, sodium iodide, potassium bromide, and sodium bromide.

11. The process of claim 10 wherein the cyanate is potassium cyanate and the catalyst is sodium bromide.

12. The process of claim 10 wherein the aprotic solvent is dimethylformamide.

References Cited

UNITED STATES PATENTS

| 3,440,269 | 4/1969 | McMaster | 260—453 |
| 3,440,270 | 4/1969 | McMaster et al. | 260—453 |
| 2,866,802 | 12/1958 | Graham | 260—453 |
| 2,866,803 | 12/1958 | DePree | 260—453 |

OTHER REFERENCES

Thorne et al., Inorganic Chemistry, Interscience Publishers, Inc., (4th ed., 1943), p. 242.

Roberts et al., Basic Principles of Org. Chem., W. A. Benjamin, Inc., p. 653 (1964).

CHARLES B. PARKER, Primary Examiner

D. H. TORRENCE, Assistant Examiner

U.S. Cl. X.R.

260—248